(12) United States Patent
Sorrentino et al.

(10) Patent No.: US 8,976,364 B2
(45) Date of Patent: Mar. 10, 2015

(54) OPTICAL GYROSCOPE

(71) Applicant: The Trustees of The Stevens Institute of Technology, Hoboken, NJ (US)

(72) Inventors: Christopher Sorrentino, Waltham, MA (US); John Robert Emmet Toland, Hoboken, NJ (US); Christopher Search, Montclair, NJ (US); Rainer Martini, Hoboken, NJ (US)

(73) Assignee: The Trustees of The Stevens Institute of Technology, Hoboken, NJ (US)

( * ) Notice: Subject to any disclaimer, the term of this patent is extended or adjusted under 35 U.S.C. 154(b) by 256 days.

(21) Appl. No.: 13/644,658

(22) Filed: Oct. 4, 2012

(65) Prior Publication Data

US 2013/0088720 A1    Apr. 11, 2013

Related U.S. Application Data

(60) Provisional application No. 61/626,916, filed on Oct. 5, 2011.

(51) Int. Cl.
*G01C 19/72* (2006.01)
*G01C 19/64* (2006.01)

(52) U.S. Cl.
CPC ..................... *G01C 19/64* (2013.01)
USPC ........................................................ 356/461

(58) Field of Classification Search
CPC ...... G01C 19/64; G01C 19/66; G01C 19/661; G01C 19/72
USPC .......................................................... 356/460
See application file for complete search history.

(56) References Cited

U.S. PATENT DOCUMENTS

| | | | |
|---|---|---|---|
| 7,187,827 B2 | 3/2007 | Montgomery et al. | |
| 7,245,801 B2 | 7/2007 | Boyd et al. | |
| 7,292,751 B2 | 11/2007 | Popovic | |
| 7,343,067 B2 * | 3/2008 | Barwicz et al. | 385/32 |
| 7,385,177 B2 | 6/2008 | Steinberg et al. | |

(Continued)

OTHER PUBLICATIONS

Scheuer et al., Sagnac Effect in Coupled-Resonator Slow-Light Waveguide Structures, The American Physical Society, PRL 96, 053901 (2006), pp. 053901-1 to 053901-4.

(Continued)

*Primary Examiner* — Jonathan Hansen
(74) *Attorney, Agent, or Firm* — Greenberg Traurig LLP

(57) ABSTRACT

A microfabricated optical gyroscope that utilizes a linear array of micron scale optical ring resonators closely spaced to allow evanescent coupling of electromagnetic fields in adjacent resonators. Within each resonator, the optical Sagnac effect produces a phase difference between clockwise and counterclockwise propagating light that is proportional to the inertial rotation rate perpendicular to the plane of the resonator. The disclosure enhances the overall sensitivity to rotations by varying the strengths of the evanescent coupling between resonators and/or the circumferences of the resonators. The size and coupling strengths control the optical interference between resonators. By using periodically alternating coupling strengths and/or linearly chirped resonator circumferences, the gyroscope transmission has extremely narrow transmission resonances with slopes, corresponding to the responsivity to inertial rotations, that are large enough to yield shot noise limited sensitivities sufficient for inertial navigation in a device size less the 1 $mm^2$ in size.

15 Claims, 13 Drawing Sheets

(56) References Cited

U.S. PATENT DOCUMENTS

| | | | |
|---|---|---|---|
| 7,941,020 | B2 | 5/2011 | Steinberg et al. |
| 2007/0211992 | A1 | 9/2007 | chu et al. |
| 2009/0027754 | A1* | 1/2009 | Steinberg et al. ............ 359/238 |
| 2009/0244544 | A1 | 10/2009 | Terrel et al. |
| 2009/0290835 | A1 | 11/2009 | Popovic |
| 2011/0037985 | A1 | 2/2011 | Qiu et al. |

OTHER PUBLICATIONS

Steinberg et al., Rotation-induced superstructure in slow-light waveguides with mode-degeneracy: optical gyroscopes with exponential sensitivity, J. Opt. Soc. Am. B, vol. 24, No. 5, May 2007, pp. 1216-1224.

Toland et al., Chirped area coupled resonator optical waveguide gyroscope, Optical Society of America, vol. 36, No. 7, Apr. 1, 2011, pp. 1221-1223.

Poon et al., Polymer Microring Coupled-Resonator Optical Waveguides, Journal of Lightwave Technology, vol. 24, No. 4, Apr. 2006, pp. 1843-1849.

Xia et al., Coupled resonator optical waveguides based on silicon-on-insulator photonic wires, American Institute of Physics, vol. 89, 041122, pp. 041122-1 to 041122-3.

* cited by examiner

1005 — Provide odd number of resonators in an array, with resonator circumferences differing by integer wavelength multiples from a waveguide towards a center resonator

Fig. 10

OPTICAL GYROSCOPE

CROSS REFERENCE TO RELATED APPLICATION

The present disclosure is related to and claims the benefit of U.S. Provisional Application No. 61/626,916, filed on Oct. 5, 2011 and titled "Actively controlled coupling and size modulation microring resonator array optical gyroscope", the contents of which are incorporated by reference herein.

FIELD

The present disclosure relates to integrated microfabricated photonic devices, and, more particularly, to optical gyroscopes.

BACKGROUND

Since the introduction of the first ring laser gyroscope (RLG) and later the fiber optic gyroscope (FOG), optical gyroscopes have become a mainstay of the global aerospace and defense industry, being used in civilian and military aircraft, rockets, and missiles for inertial navigation and varying other applications such as vehicle and antenna stabilization. Both gyroscopes operate via the Sagnac effect by which light traveling around a closed path experiences in the presence of an inertial rotation an increased optical path length when co-propagating with the rotation and a decreased path length when counter-propagating relative to the rotation. The Sagnac phase shift between light beams copropagating and counterpropagating relative to an inertial rotation Q around a closed path enclosing an area A is $$\Theta_{Sagnac} = \frac{8\pi A \Omega}{\lambda \sigma}$$

where $\lambda$ is the optical wavelength. The phase shift can be measured as an interference pattern in the optical intensity when the two beams are combined in a FOG or as a frequency splitting of the lasing modes of the RLG.

Despite their success, RLGs and FOGs are unsuitable for many portable device applications because of their relatively large size and weight. A typical RLG weighs several kilograms with a volume exceeding 2000 cm$^3$ and uses around 10 W of power while FOGs are only slightly better, weighing at least several hundred grams and utilizing a kilometer or more of optical fiber wrapped around a circular core with a radius 10 cm. MEMS (microelectromechanical systems) gyroscopes are miniaturized mechanical gyroscopes that can be integrated onto a standard semiconductor microchip and are used in smart phones, tablet computers, and digital cameras. However, the best MEMS gyroscopes have sensitivities that are on the order of 10 deg. per hour, which is far greater than the 0.01 deg. per hour or better sensitivities needed for inertial navigation.

Coupled resonator optical waveguides (CROWs) are arrays of circular microfabricated high-Q optical resonators originally conceived as a means of engineering the optical dispersion and group velocity of light in an integrated photonic device. CROWs are often used for optical buffering, filtering, and dispersion control in integrated optics and are routinely fabricated. The resonators are arranged into a linear array with an input waveguide that couples light into the first resonator and an output waveguide that extracts light from the final resonator of the array. The input and output coupling of the light as well as the propagation of light between resonators occurs by evanescent coupling of the electromagnetic waves between resonators. This coupling can be varied to control the optical transmission and pulse propagation velocity.

Optical Sagnac gyroscopes have used CROWs. The slow optical group velocities in CROWs were believed to lead to an enhanced sensitivity to rotations. Moreover, utilizing microresonators with radii ~10-100 μm and N~10-100 resonators have been made with silicon on insulator waveguides or polymer rings on silicon oxide, the overall dimensions are typically comparable to MEMS gyroscopes. It was later shown, however, that the enhanced sensitivity was a result of an improper evaluation of the sensitivity and, in reality, the sensitivity of a CROW gyroscope is equal to a resonant FOG (RFOG) with the same enclosed area. Since the sensitivity of a Sagnac gyroscope is proportional to the enclosed area and the area of a microresonator CROW gyroscope would be 105-106 times smaller than commercial FOGs, the utility of CROW gyroscopes would be quite limited. Previous proposals for CROW gyroscopes have all been based on arrays of equal size high-Q microresonators and identical evanescent coupling resulting in a periodic structure.

SUMMARY

The present disclosure relates to the variations in the strength of the evanescent couplings between resonators, κ, and in the circumferences of the individual resonators. These size and coupling variations introduce new periodicities in the array resulting in interference between the resonators that improves the sensitivity by a factor of at least $10^5$ thereby making CROW gyroscopes suitable for applications including inertial navigation.

The present disclosure facilitates a new type of integrated optical gyroscope composed of a linear array of optical microring resonators with couplings between the resonators, and resonator circumferences engineered to produce the maximum gyroscopic rotation sensitivity via the Sagnac effect. This gyroscope overcomes the difficulties of low rotation sensitivities in previous CROW gyroscopes while using a similar structure of coupled microring resonators albeit without uniform coupling and resonator sizes as in the CROW.

The gyroscope offers the size advantages of MEMS along with sensitivities comparable to much larger commercial optical gyroscopes. In an embodiment, it has an overall size of ~1.0-0.01 mm$^2$ and shot noise limited sensitivity ~0.1-0.0001 deg. per hour depending on the number of resonators, the average size of the resonators, and the precise form of the coupling and/or circumference modulation.

In one aspect, an optical gyroscope includes a plurality of resonators arranged in an array and couplings. Each coupling is connected to at least one resonator in the array. Each coupling has a coupling strength, where the coupling strength is symmetric about a center resonator in the array and the coupling strength of consecutive couplings starting from the center resonator and moving outward in the array differ to enable evanescent coupling of electromagnetic fields in adjacent resonators in the plurality of resonators.

In one embodiment, the coupling strength of consecutive couplings starting from the center resonator and moving outward in the array alternates between a strong coupling strength above a strong modulation threshold and a weak coupling strength below a weak modulation threshold. In one embodiment, each resonator in the array is connected via a coupling to an adjacent resonator or to a waveguide. In one embodiment, when the coupling strength of a coupling is the weak coupling strength, light circulates a plurality of times in each resonator before leaking into an adjacent resonator. When the coupling is strong, the light circulates fewer times by an amount equal to the ratio of the weak to strong coupling strengths. A Sagnac phase shift for a single resonator is enhanced by a factor proportional to an average number of times the light circulates before coupling into the adjacent resonator. The evanescent coupling of electromagnetic fields in adjacent resonators can result in a single narrow transmission resonance at zero optical phase. In one embodiment, the single narrow transmission resonance results in a gyroscope not needing phase biasing. In one embodiment, the coupling strength decreases with separation between resonators due to reduced overlap of evanescent electric fields. In one embodiment, the coupling strength depends on a ratio of indices of refraction in a resonator in the array and in the region surrounding the resonator.

In another aspect, a method includes arranging a plurality of resonators into an array; providing a plurality of couplings, each coupling connected to at least one resonator in the plurality; and setting a coupling strength for each coupling, the coupling strength symmetric about a center resonator and the coupling strength of consecutive couplings starting from the center resonator and moving outward in the array differing. The change in the coupling is enabled by the evanescent coupling of electromagnetic fields in adjacent resonators in the plurality of resonators.

In another aspect, an optical gyroscope includes a plurality of resonators arranged in an array with symmetric chirping of the resonators, with resonator circumferences differing by integer wavelength multiples from an input waveguide towards a center resonator, the differences in circumferences between adjacent resonators being an integer multiple of the optical wavelength $\lambda_0$, where $\lambda_0$ is a resonance wavelength of a first resonator satisfying the condition $M_i \lambda_0 = 2\pi R_i$ where $2\pi R_i$ is the circumference of the first resonator and $M_i$ is a positive integer. In one embodiment, the resonator circumferences decrease by integer wavelength multiples from a waveguide towards a center resonator. In another embodiment, the resonator circumferences increase by integer wavelength multiples from a waveguide towards a center resonator.

BRIEF DESCRIPTION OF THE DRAWINGS

In the drawing figures, which are not to scale, and where like reference numerals indicate like elements throughout the several views:

FIG. 10 is a flowchart showing a step performed to form the gyroscope of FIGS. 5A and 5B in accordance with an embodiment of the present disclosure.

DETAILED DESCRIPTION

Figure 1A:
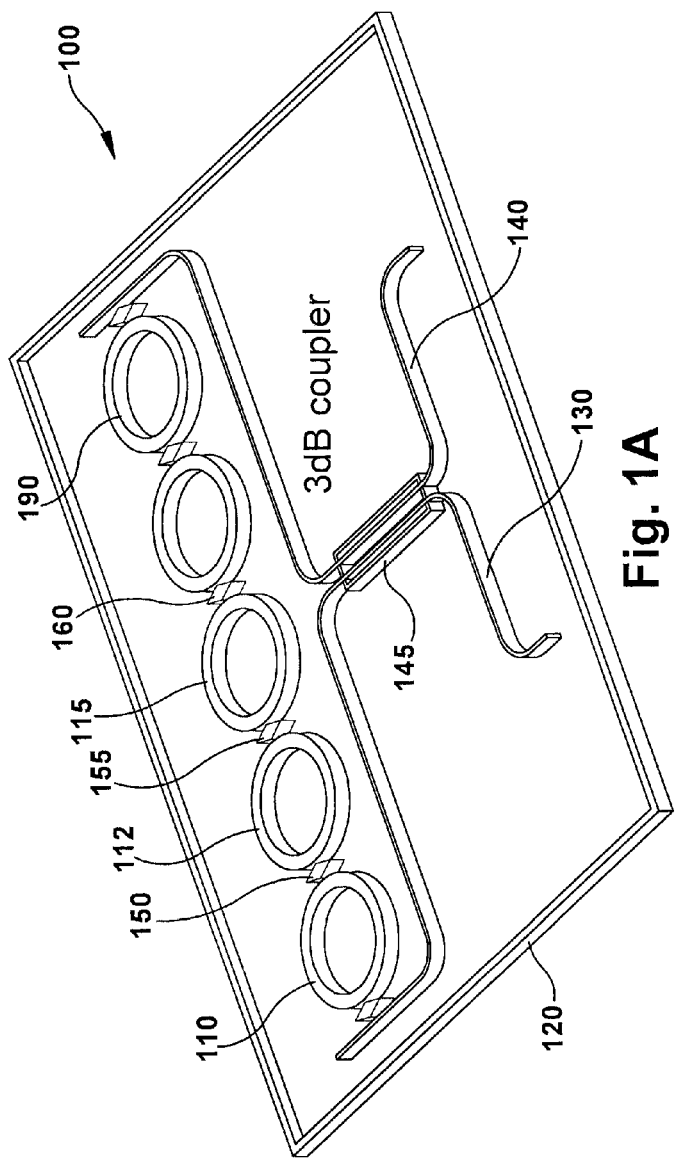
FIG. 1A is a perspective view of an actively controlled coupling and size modulation microring resonator array optical gyroscope constructed in accordance with an embodiment of the present disclosure.

Described herein are embodiments for modulating the size and couplings of resonators that may be used individually or in combination to increase the sensitivity to inertial rotations by orders of magnitude.

One embodiment for enhancing the sensitivity of the coupled resonators is by periodically modulating the evanescent coupling κ between resonators between weak and strong coupling. This coupling is symmetric about the central resonator of the array. The addition of this new periodicity in the array spreads out the transmission band leaving a single isolated transmission resonance centered at $\Omega=0\ s^{-1}$. Rotation measurements in the vicinity of this resonance yield shot noise limited sensitivities $10^1$-$10^9$ better than previously proposed CROW gyroscopes with 11-21 resonators. By increasing the difference between strong and weak coupling κ's, one can achieve rotation sensitivities that would otherwise require a CROW with an orders of magnitude larger footprint.

Another embodiment is chirping the circumference of the resonators by an integer number of wavelengths in a manner that is symmetric with respect to the center resonator of the array which will result in a dramatic enhancement of the sensitivity to the Sagnac phase shift by producing narrow transmission resonances in the transmission stop gap. For a symmetrically chirped array, the center ring is the smallest and the resonators subsequently increase by an equal amount from one ring to the next going away from the center ring. The opposite chirping is also possible where the resonators increase in size by an equal amount going towards the center resonator. The resonance condition between the resonators is maintained so that transport through the array is allowed by energy conservation. Therefore, the difference in circumferences between resonators is an integer number of wavelengths.

In addition, real time dynamic control of the sensitivity and dynamic range of the gyroscope is achievable by local modulation of the index of refraction using the thermo-optic effect by which the index of refraction of the microresonators and cladding materials depend on the temperature, $n(T)=n_0+(dn/dT)\Delta T$. The effective size of a resonator can be controlled by changing the optical path length, which is proportional to both the circumference of the resonator and the index of refraction of the resonator material. The evanescent coupling between resonators is a function of both the separation between the resonator waveguides and the difference in the indices of refraction between the resonator and the cladding material surrounding the resonators in the spacing between them.

In one embodiment, metal contacts located above either individual sections of resonators or located above the gap region between adjacent resonators are used, where the evanescent coupling occurs. In one embodiment, the indices of refraction can be locally changed by applying a current to the metal contacts. The current in the contacts causes them to heat up due to their electrical resistance and this causes a local change in the temperature of the resonator structure located below the contact. In this way, the effective size of the resonators and/or the inter-resonator couplings can be controlled in real time via the current applied to each individual metal contact.

FIG. 1A is a perspective view of an actively controlled coupling and size modulation microring resonator array optical gyroscope 100 constructed in accordance with an embodiment of the present disclosure. The gyroscope 100 comprises a one dimensional array of optical microring resonators (e.g., resonator 110, 112, 190 and center resonator 115) on a planar substrate 120 connected to input and output optical waveguides 130, 140 at either ends. The input and output waveguides 130, 140 are coupled by 3 dB coupler 145. Although described herein as a 3 dB coupler, other dB couplers are also possible.

Each resonator (e.g., resonator 110 and resonator 112) in the array are connected to either a waveguide (at the ends of the array) or another resonator via a coupling (e.g., coupling 150 connecting resonator 110 with resonator 112). Each coupling connected to a resonator in the array has a coupling strength, where the coupling strength of consecutive couplings (e.g., coupling 150, 155) differ to enable distributed interference of electromagnetic fields in adjacent resonators in the plurality of resonators. The coupling strength is, however, symmetric about the center resonator 115 in the array, such that coupling 155 and coupling 160 have the same coupling strength. In one embodiment, the evanescent coupling between resonators is periodically modulated. Although illustrated as a single resonator 110 and a single coupling 150, a general resonator in the array will be referred to herein as resonator 110 and a general coupling will be referred to herein as coupling 150.

Figure 1B:
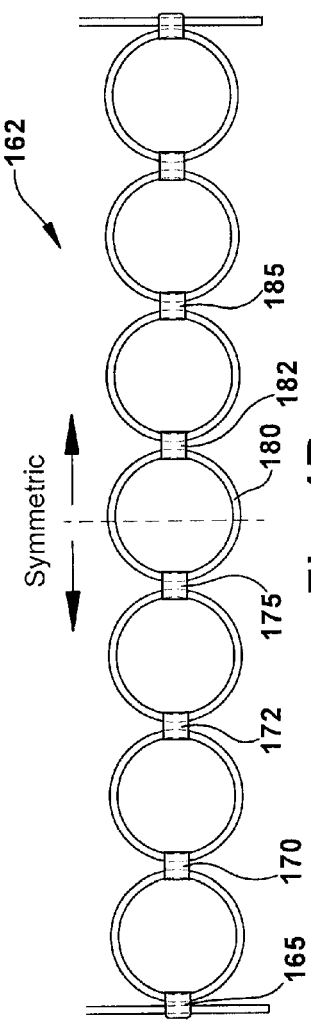
FIG. 1B is a schematic diagram of resonators connected with couplings of different strengths to produce evanescent couplings $\kappa_j$ in accordance with an embodiment of the present disclosure.

FIG. 1B is a schematic diagram of resonators in an array 162 connected with couplings of different strengths to produce evanescent couplings $\kappa_j$ in accordance with an embodiment of the present disclosure. As stated above, a first coupling 165 in array 162 has a weak coupling strength (e.g., below a weak modulation threshold) and the next coupling 170 has a strong coupling strength (e.g., above a strong modulation threshold). The next coupling 172 in the array 162 has a weak coupling strength. Thus, consecutive couplings 165, 170, 172, 175 have differing coupling strengths, in one embodiment alternating between a strong coupling strength and a weak coupling strength. Resonator 180 is the center resonator in the array 162. The coupling strength of the couplings are symmetric about the center resonator 180. Thus, coupling 182 has the same coupling strength as coupling 175 (e.g., a strong coupling strength). and then coupling 185 has a weak coupling strength. This configuration produces a coupling "superlattice" that is symmetric about the center resonator 180. In one embodiment, the result is interference between the resonators that improves the sensitivity by a factor of at least $10^5$, thereby making CROW gyroscopes suitable for applications including position, stabilization, and inertial navigation. For example, the gyroscope could be suitable for inertial navigation for vehicles as either a complement to GPS or in GPS denied areas, image stabilization for video and/or photographic equipment deployed on mobile platforms (e.g., cars, airplanes, helicopters, etc.), smart phones, video game controllers, tablet computers, positioning control of artillery, gun turrrets, radio antennae, spacecraft, robots, etc.

In more detail, arrays of micron scale optical ring resonators can be fabricated with, for example, silicon on insulator wave guides (Si waveguides on $SiO_2$ substrate) or polymer rings (SU-8 or PMMA photoresists) on silicon or $SiO_2$ substrates. In one embodiment, the materials are chosen so that the resonators function in the telecommunications band with wavelengths around 1.55 micrometers. In one embodiment, the resonators are fabricated with the radii between 10 and 100 micrometers. In one embodiment, the resonator array itself contains between 10 and 100 resonators. However, this is by no means an upper (or lower) limit on the number of resonators that the array can contain.

Referring to FIG. 1A again, the resonators are arranged into a linear array 100 with an input waveguide 130 that couples light into the first resonator 110 and an output waveguide 140 that extracts light from the final resonator 190 of the array 100. The input and output coupling of the light as well as the propagation of light between resonators occurs by evanescent coupling of the electromagnetic waves between resonators with κ representing the intensity coupling between resonators. This coupling creates waveguide modes in which clockwise propagating modes couple to counterclockwise propagating modes of adjacent resonators and vice versa enabling an optical signal to traverse the entire array via constantly flipping from clockwise to counterclockwise propagation when jumping between resonators.

The microresonator array 100 functions as a gyroscope by injecting an input optical signal into the input waveguide 130 and then measuring the optical transmission through the array in the output waveguide 140. An equivalent approach that allows the array to function as a gyroscope is to connect the input and output waveguides by a 3 dB power coupler 145. An optical signal is injected into one of the input ports (e.g., input waveguide 130) where it is split into two signals by the 3 dB coupler 145. The split beams are then launched into both ends of the array by evanescent coupling between the waveguides 130, 140 and end resonators 110, 190. One signal propagates through the array from left to right while the other propagates from right to left finally exiting at the opposite end of the array 100. The output signals are then recombined at the 3 dB coupler 145 where they interfere to produce output signals in the two ports 130, 140 of the coupler 145. In order for the resonator array 100 to couple to the output port of the 3 dB coupler 145, the number of resonators is odd.

Rotational motion about an axis perpendicular to the resonators is detected via a phase shift between light in counter propagating modes of each resonator 110. The phase shift is a consequence of the Sagnac effect, which is also the basis for typical optical gyroscopes. Due to the rotation, light traveling in the mode, which is in the same direction as the rotation, experiences a larger round-trip path length around the resonator 110 and hence larger propagation phase. Similarly, light traveling in the mode opposite the direction of rotation experiences an effective shorter round-trip path length and smaller propagation phase. The phase difference between the modes is proportional to the rotation rate and enclosed area of the resonator 110. For a single resonator 110, the Sagnac phase shift between modes is:

$$\phi_S = \frac{4\pi\omega\Omega R^2}{\sigma^2}$$

When the evanescent coupling of the electromagnetic field κ between resonators is weak, the light circulates many more times in each resonator 110 before "leaking" into the nearest neighbor resonator. For strong coupling, the light circulates fewer times. As a result of the multiple roundtrips, the Sagnac phase shift for a single resonator 110 is enhanced by a factor proportional to the average number of times the light circulates before coupling into the neighboring resonator, where the process starts again. The number of times light circulates in each resonator 110 before coupling into the neighboring resonator is $$\frac{1}{2\kappa}$$

and by decreasing the coupling 150 between resonators 110, 112, the Sagnac phase shift per resonator can be enhanced.

In one embodiment, the coupling 150 decreases with the separation between resonators 110, which in one embodiment can be physically controlled in the fabrication stage. The coupling 150 can also depend on the ratio of the indices of refraction in the resonator 110 and in the surrounding region. In one embodiment, the index of refraction of the resonator 110 is locally modified electrically using the Kerr effect. In one embodiment, the use of local heating using the strong thermo-optic coefficient in polymer and silicon microring resonators enables the index of refraction and thus the coupling to be varied dynamically. These methods of altering the coupling 150 between resonators 110 allow periodic changes in coupling strength to be introduced into a CROW gyroscope. In one embodiment, this periodic change in the coupling 150 alternates between weak and strong coupling, producing a coupling superlattice. The unit cell of this superlattice consists of two ring resonator segments, where the unit cells always begin and end with the same coupling strength while the alternate coupling occurs between the two rings in the unit cell of the superlattice structure.

Mathematically the couplings can be expressed as:

$$\kappa_j = \begin{cases} \kappa_\alpha & j = 1, 3, 5, \ldots (N+1)/2 \\ \kappa_\beta & j = 2, 4, 6, \ldots (N-1)/2 \\ \kappa_\alpha & j = 1+(N+1)/2, 3+(N+1)/2, \ldots, N+1 \\ \kappa_\beta & j = 2+(N+1)/2, 4+(N+1)/2, \ldots, N \end{cases}$$

Here $\kappa_\alpha$ and $\kappa_\beta$ are the two different coupling strengths and N is the number of resonators. For j=1, the coupling is between the input waveguide 130 and first resonator 110 while for j=N+1, the coupling is between the Nth resonator and output waveguide 140.

As stated above, the gyroscope includes a CROW array with ring shaped resonators. Such CROW arrays have been realized in a diverse range of physical systems, including (with resonator Q-factors and ring radii R):
  i. Silicon rings (Q=500,000, R~10 μm)
  ii. Polymer rings (Q=20,000, R~32 μm)
  iii. Hydex rings (Q=400,000, R~40 μm)
  iv. Silica toroids (Q=$10^8$, R~60 μm)
  v. Photonic crystal defects (Q=45,000, R-10 μm)

A typical CROW gyroscope can consist of polymer microrings on a silicon substrate. Two commonly used polymers are SU-8, a photoresist, and polymethyl methacrylate (PMMA). In one embodiment, the polymer is spun onto a silicon wafer and then electron beam lithography is used to etch the microrings. As an example, a CROW array can include 25 resonators, each having a radius of 116 μm while the height and width of the structure being 1.6 mm and 2.0 mm, respectively.

Figure 2:
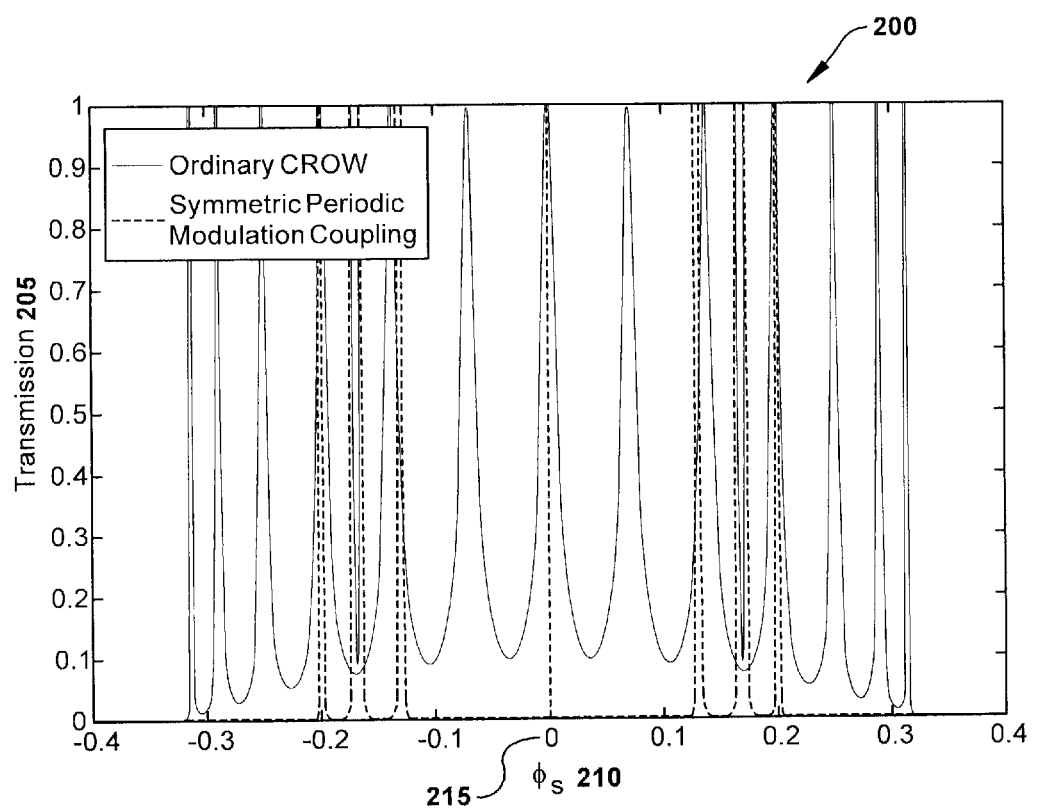
FIG. 2 is a graph of the transmission spectrum as a function of Sagnac phase shift per resonator for the alternating symmetric coupling resonator array of the actively controlled coupling and compared to an ordinary CROW with identical couplings and resonator sizes in accordance with an embodiment of the present disclosure.

FIG. 2 is an embodiment of a graph 200 of the transmission spectrum 205 as a function of Sagnac phase shift 210 per resonator for the alternating symmetric coupling resonator array 100 of the actively controlled coupling and size modulation mirroring resonator array optical gyroscope shown in FIG. 1A. There is single transmission resonance at 0 phase 215. The solid line in the graph 200 shows the transmission through an ordinary CROW gyroscope with the same number and size resonators and the dashed line in the graph 200 shows symmetric periodic modulation coupling.

Figure 3A:
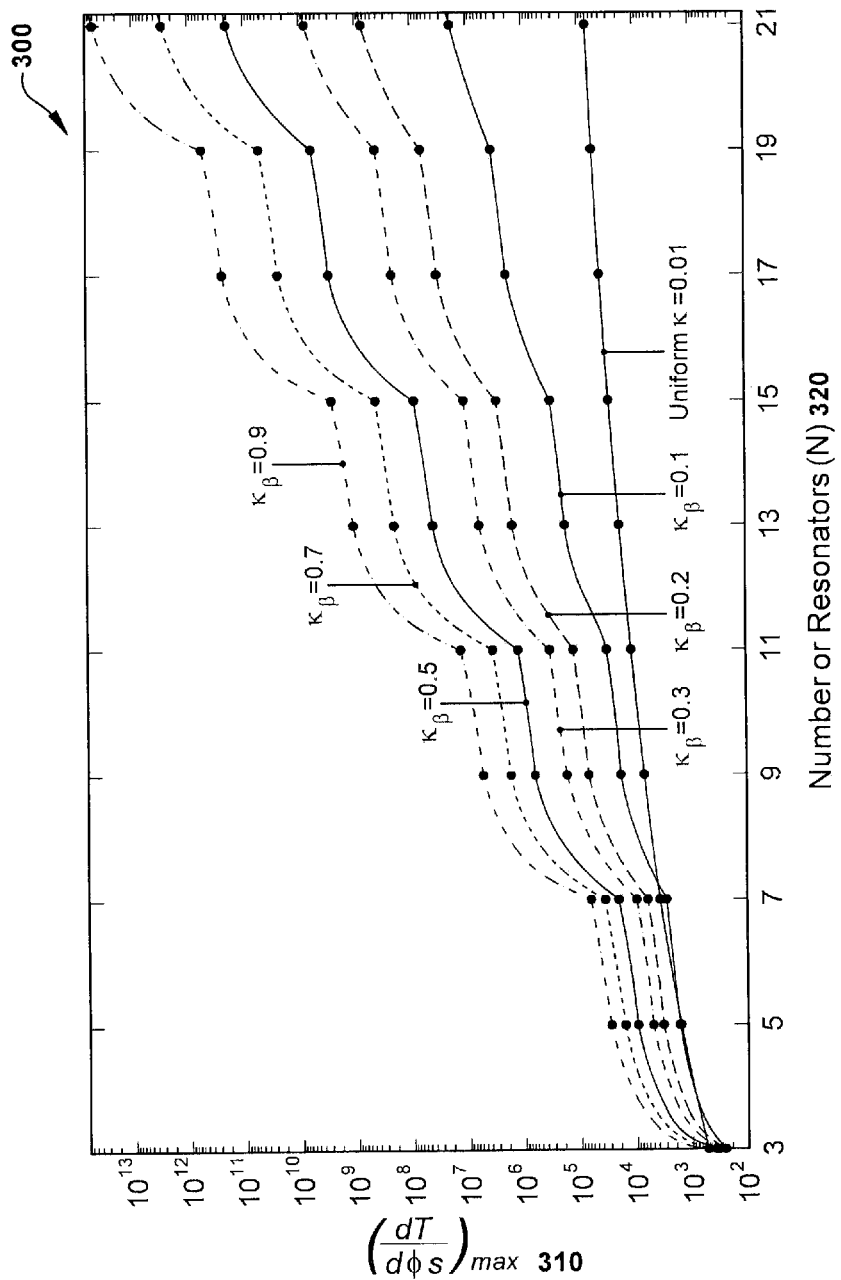
FIG. 3A is a graph showing the maximum value of the derivative of the optical transmission with respect to Sagnac phase shift per resonator, $dT/d\phi_S$, in the vicinity $\phi_S=0$ as a function of N for various coupling modulation strengths with weak coupling at the edges, $\kappa_{\alpha=0.01}$, alternating with strong coupling, $\kappa_{\beta>>}\kappa_\alpha$ in accordance with an embodiment of the present disclosure in FIG. 1A, also maximum $dT/d\phi_S$ for a uniform array with identical couplings $\kappa=0.01$ or $\kappa=0.1$ at the edge of the transmission band in accordance with an embodiment of the present disclosure.
Figure 3B:
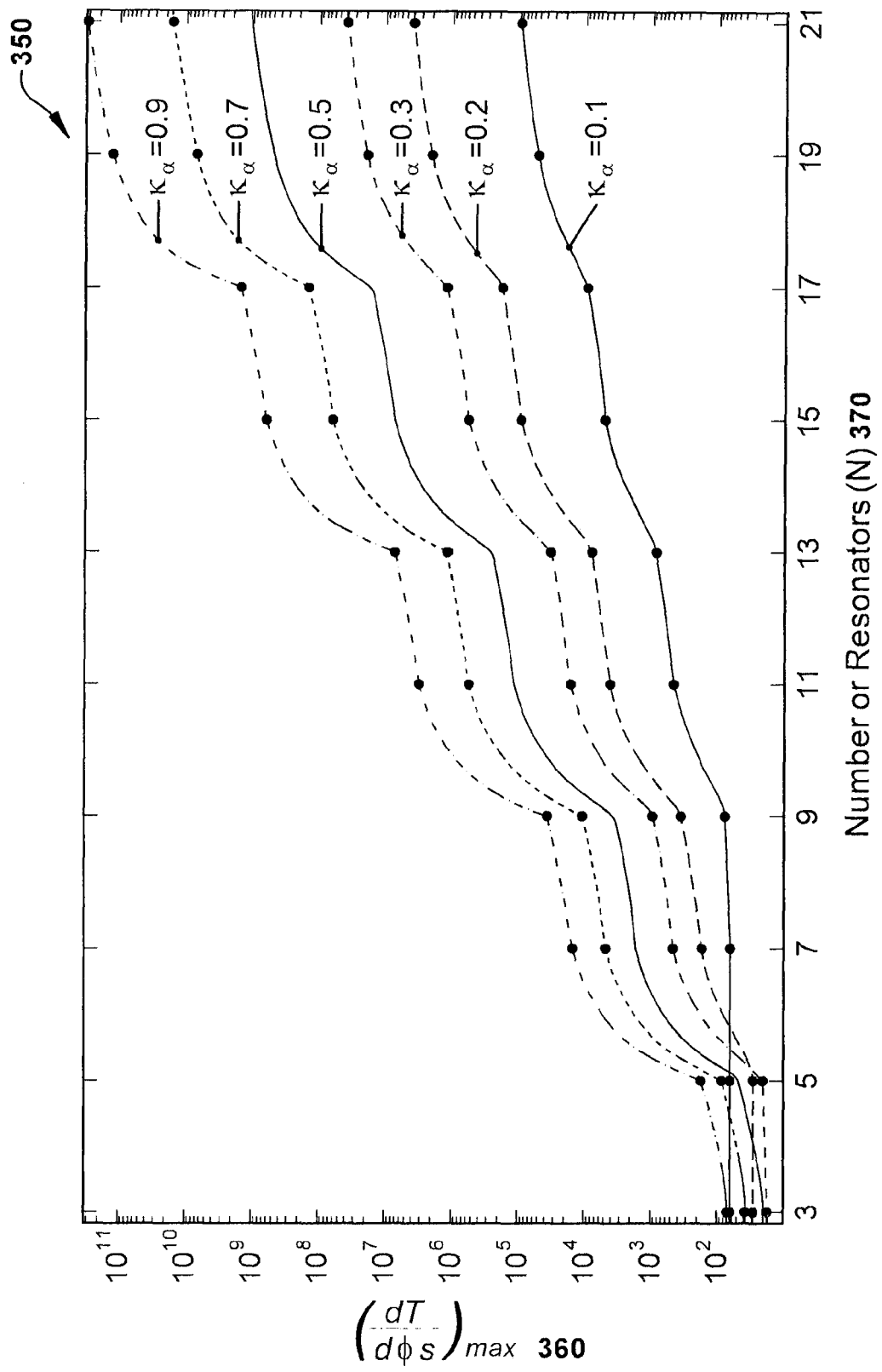
FIG. 3B is a graph showing the maximum value of the derivative of the optical transmission with respect to Sagnac phase shift per resonator, $dT/d\phi_S$, in the vicinity $\phi_S=0$ as a function of N for various coupling modulation strengths with strong coupling at the edges $\kappa_\alpha$, alternating with weak coupling $\kappa_{\beta=0.01}<<\kappa_\alpha$ in accordance with an embodiment of the present disclosure in FIG. 1A.

FIG. 3A is a graph 300 showing the maximum value 310 of the derivative of the optical transmission with respect to Sagnac phase shift per resonator, $dT/d\phi_S$, in the vicinity $\phi_S=0$ as a function of N 320 for various coupling modulation strengths with weak coupling at the edges, $\kappa_\alpha \ll \kappa_\beta$ in accordance with an embodiment of the present disclosure. FIG. 3B is a graph 350 showing the maximum $dT/d\phi_S$ 360 as a function of N 370 with strong coupling $\kappa_\alpha \gg \kappa_\beta$, $\alpha$ at the edges alternating with weak coupling $\kappa_\beta$ in the vicinity $\phi_S=0$ in accordance with an embodiment of the present disclosure.

Figure 4A:
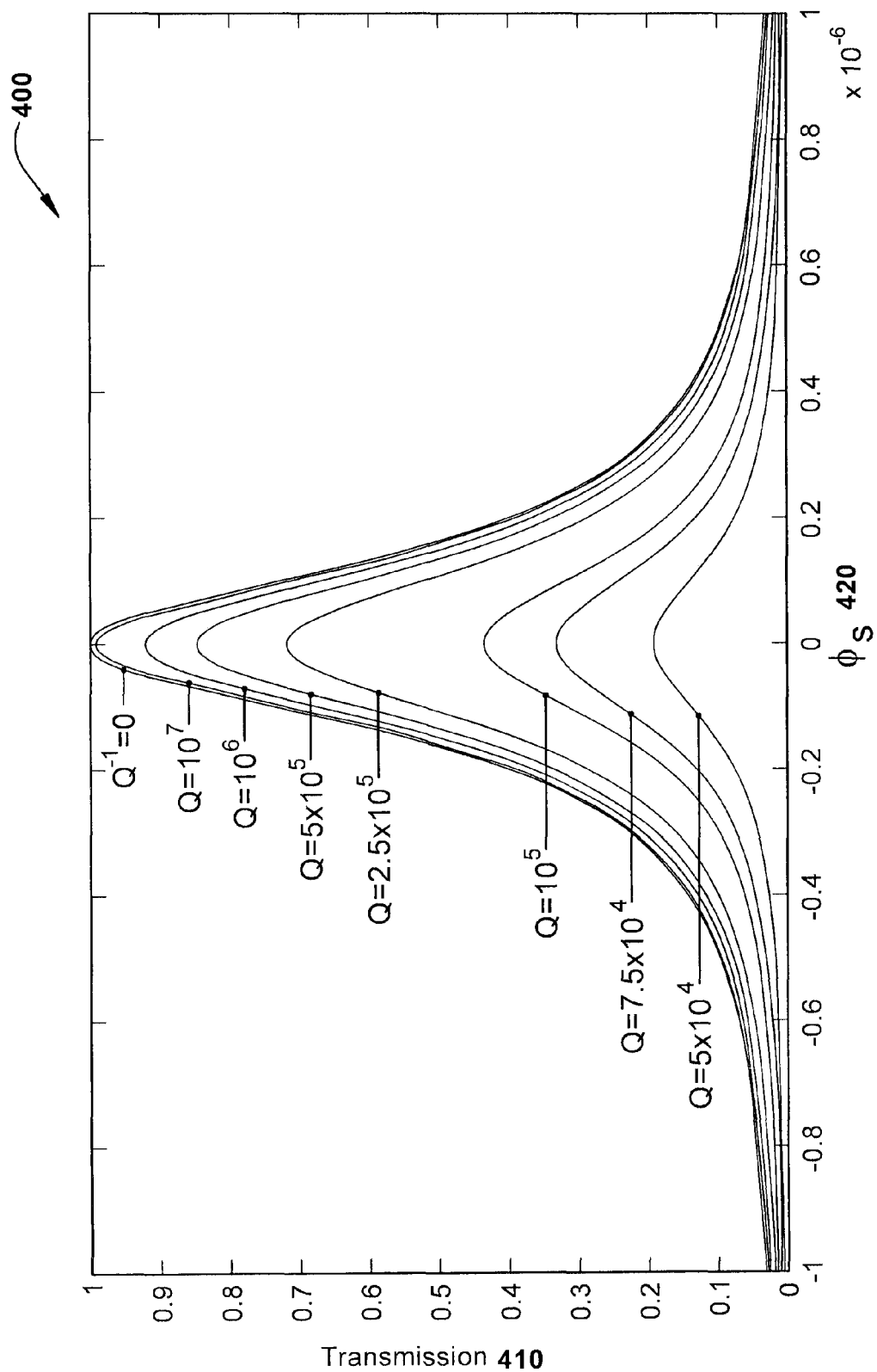
FIG. 4A is a graph showing the effect of finite resonator Q-factors, $Q_{int}$, on the transmission resonance of the coupling modulated array in FIG. 1A for $\kappa_\alpha=0.01$ and $\kappa_\beta=0.7$ and N=11 resonators, where the resonators have radii R=25 μm and index of refraction n=1.6, in accordance with an embodiment of the present disclosure.
Figure 4B:
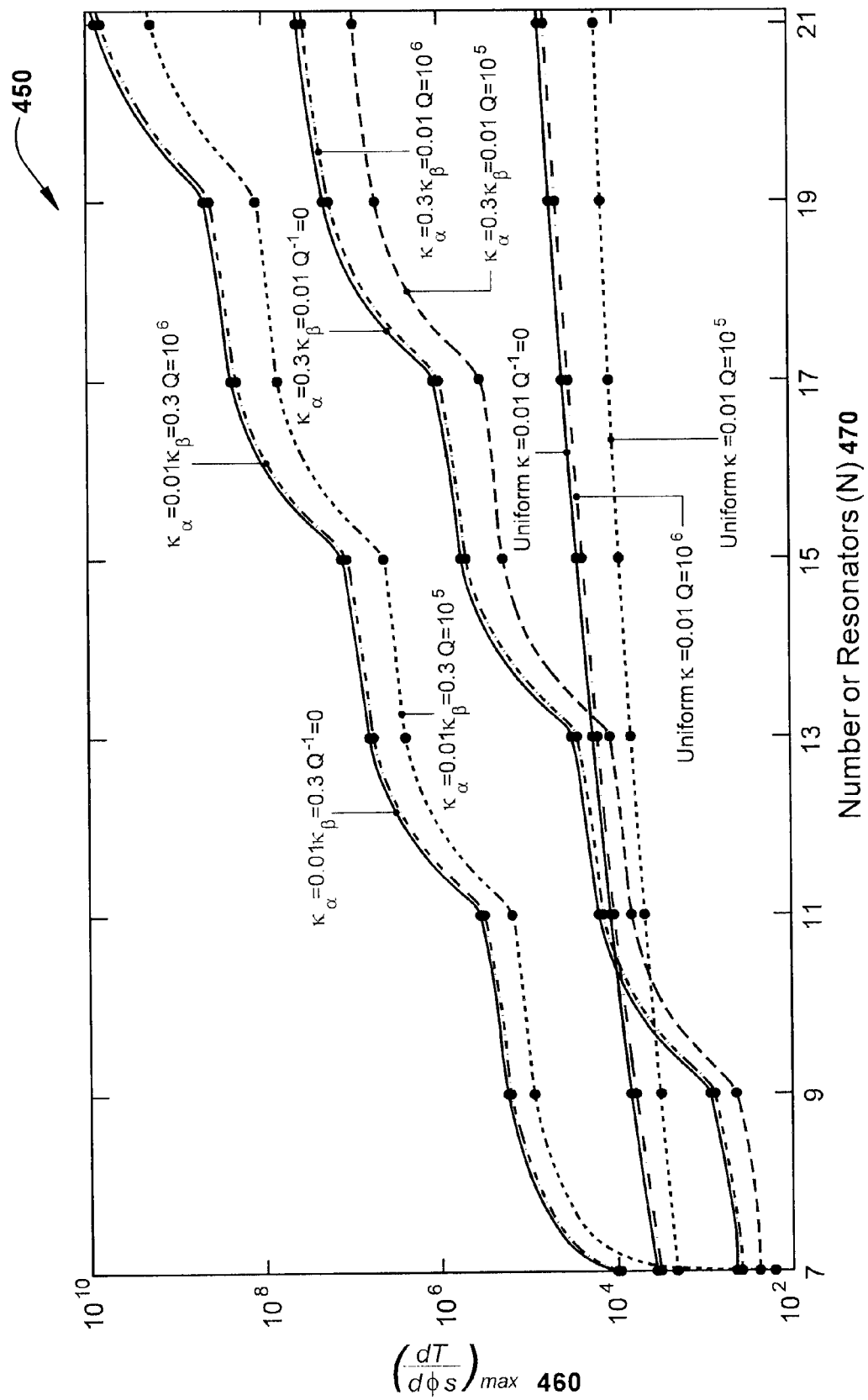
FIG. 4B is a graph showing the maximum $dT/d\phi_S$ in the vicinity $\phi_S=0$ as a function of N for finite $Q_{int}$ and coupling constants modulations $\kappa_\alpha=0.01$ and $\kappa_\beta=0.3$ (corresponding to FIG. 3(a)) and $\Lambda_\alpha=0.3$ and $\kappa_\beta=0.01$ (corresponding to FIG. 3(b)). Also shown is the maximum $dT/d\phi_S$ for a uniform CROW with $\kappa=0.01$ at the edge of the transmission band. The resonators have radii R=25 μm and index of refraction n=1.6 in accordance with an embodiment of the present disclosure.

FIG. 4A is a graph 400 showing the effect of finite resonator Q-factors, $Q_{int}$, on the transmission resonance 410 of the coupling modulated array 100 in FIG. 1A as a function of Sagnac phase shift per resonator $\phi_S$ 420 for $\kappa_\alpha=0.01$ and $\kappa_\beta=0.7$ and N=11 resonators. FIG. 4B is a graph 450 showing maximum value of transmission slope vs. Sagnac phase shift per resonator, $dT/d\phi_S$, 460 in the vicinity $\phi_S=0$ as a function of N 470 for finite $Q_{int}$ and coupling constants modulations $\kappa_\alpha=0.01$ and $\kappa_\beta=0.3$ (corresponding to FIG. 3A) and $\kappa_\alpha=0.3$ and $\kappa_\beta=0.01$ (corresponding to FIG. 31B). The resonators have radii R=25 μm and index of refraction n=1.6.

Figure 5A:
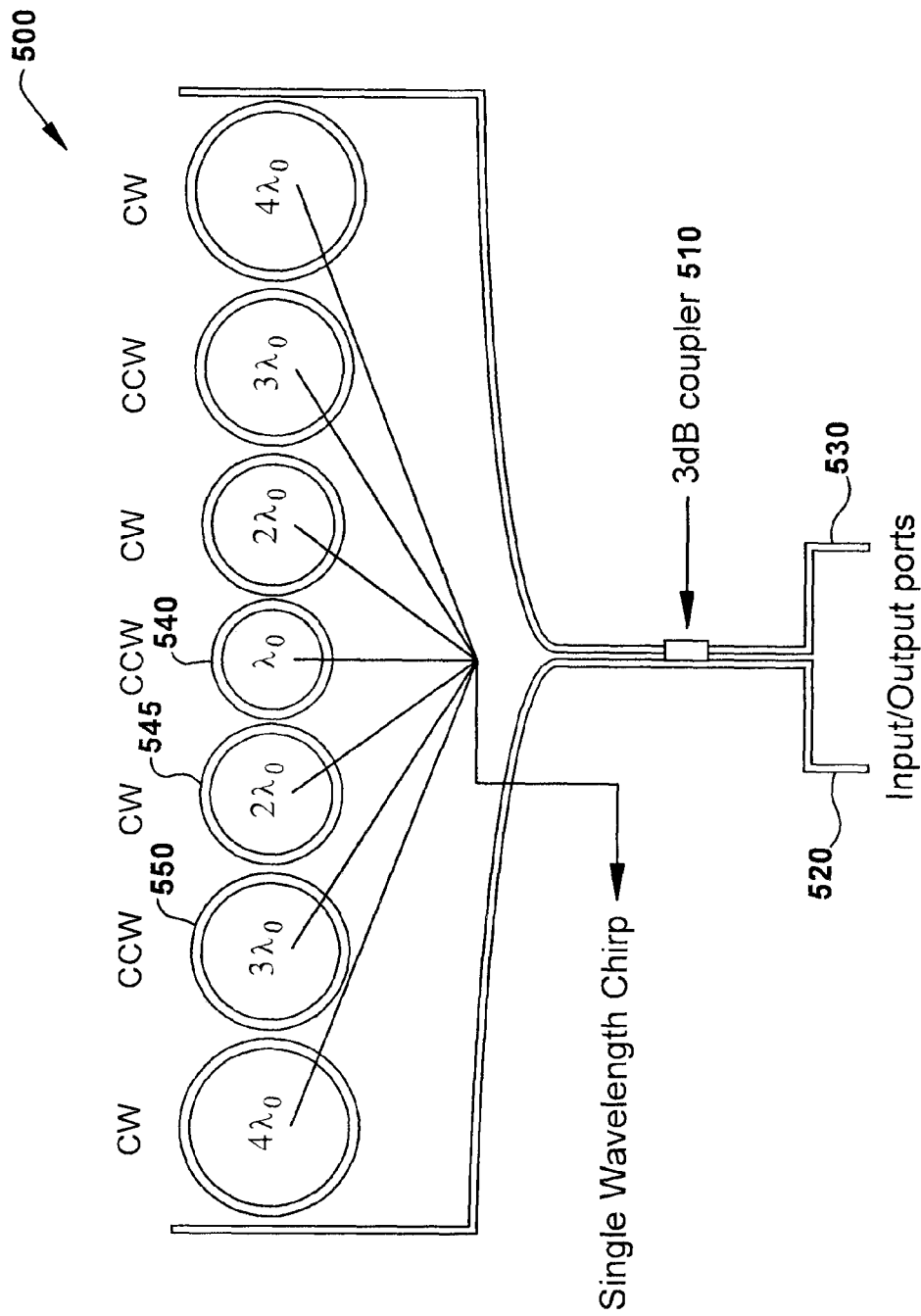
FIG. 5A is a schematic diagram of a one dimensional array of optical microring resonators on a planar substrate connected to a coupler with symmetric chirping of the ring resonators, with resonator circumferences decreasing in one wavelength multiples from the input/output waveguides towards the central resonator in accordance with an embodiment of the present disclosure.

FIG. 5A is a schematic diagram of a one dimensional array of optical microring resonators 500 on a planar substrate connected to a 3 dB coupler 510 with symmetric chirping of the ring resonators, with resonator circumferences decreasing in one wavelength multiples from the input/output waveguides 520, 530 towards central resonator 540. The differences in the circumferences between adjacent resonators (e.g., resonators 545, 550) is one optical wavelength $\lambda_0$. $\lambda_0$ is a resonance wavelength of the resonator satisfying the condition $M_i \lambda_0 = 2\pi R_i$ where $2\pi R_i$ is the circumference of the resonator and $M_i$ is a positive integer. In FIG. 5A, CW represents the propagation direction of clockwise of light in the resonator and CCW represents a propagation direction of counterclockwise for light in the resonator.

Figure 5B:
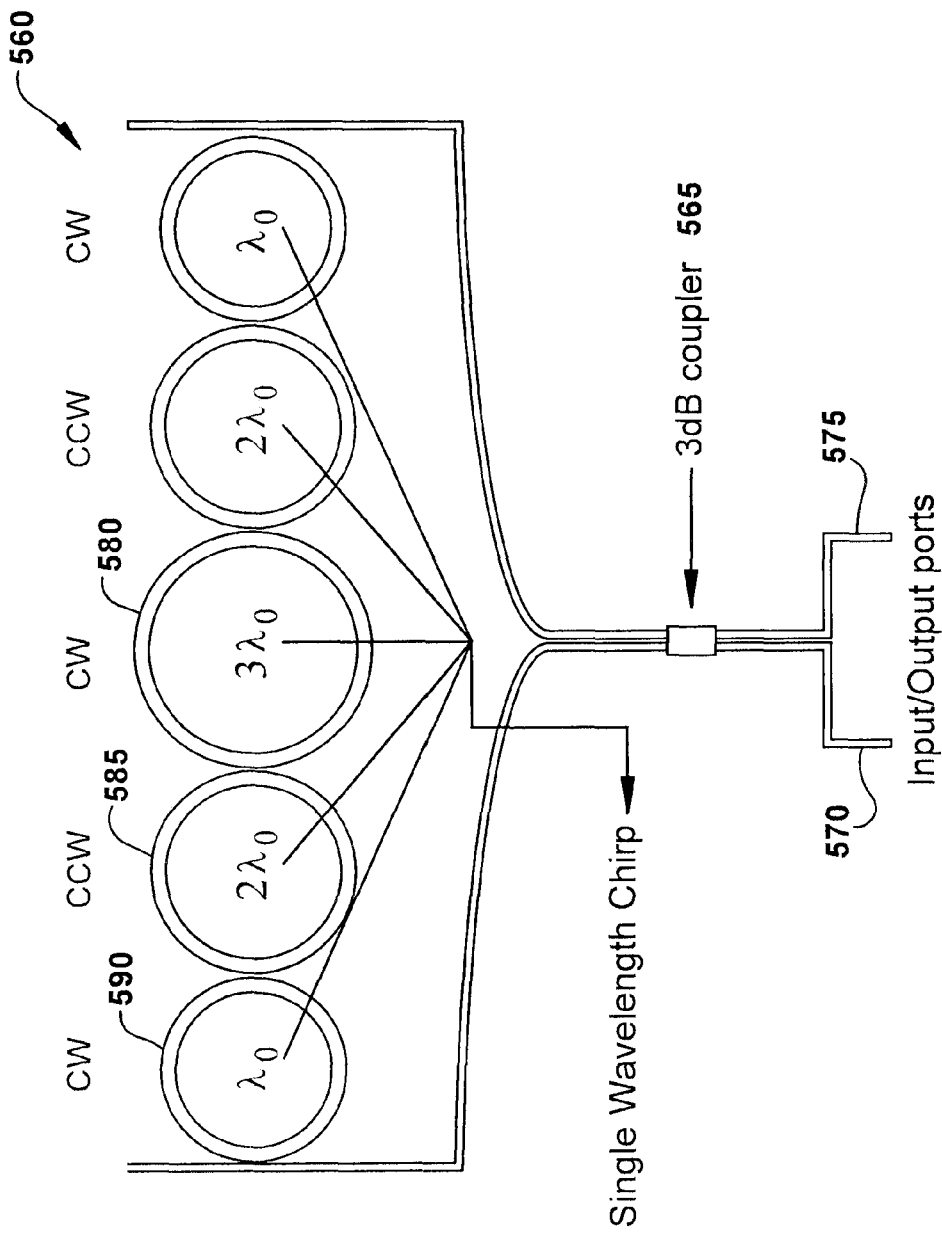
FIG. 5B is a schematic diagram of a one dimensional array of optical microring resonators on a planar substrate connected to a coupler with symmetric chirping of the ring resonators, with circumferences increasing in one wavelength multiples from the input/output waveguides towards the central resonator in accordance with an embodiment of the present disclosure.

FIG. 5B is a schematic diagram of a one dimensional array of optical microring resonators 560 on a planar substrate connected to a 3 dB coupler 565 with symmetric chirping of the ring resonators, with circumferences increasing in one wavelength multiples from the input/output waveguides 570, 575 towards central resonator 580. The differences in the circumferences between adjacent resonators (e.g., resonators 585, 590) is one optical wavelength $\lambda_0$. $\lambda_0$ is a resonance wavelength of the resonator satisfying the condition $M_i \lambda_0 = 2\pi R_i$ where $2\pi R_i$ is the circumference of the resonator and $M_i$ is a positive integer. In FIG. 5B, CW represents a propagation direction of clockwise for light in the resonator and CCW represents a propagation direction of counterclockwise for light in the resonator.

In more detail, an array (e.g., array 500, 560) in which an area chirp has been implemented consists of resonators of different circumferences, which increase linearly from one resonator to the next. A symmetric circumference chirp can be applied to a CROW in several ways. In one embodiment (FIG. 5A), the center ring 540 is the smallest in size and the resonators subsequently increase in size by an equal amount from one ring to the next going away from the center ring 540. In another embodiment (FIG. 5B), the center ring 580 can be the largest resonator in size with the resonators subsequently decreasing in size by an equal amount from one ring to the next going away from the center ring 580. In considering an array 500, 560 in which the microresonators are of different sizes, the resonance condition between them is maintained so that transport through the array 500, 560 is enabled. Since the resonators are driven at a common resonance frequency, the fractional change in circumference is $\delta L = m\lambda$, where $\lambda = 2\pi c/n\omega$ is the wavelength of a resonant mode of the smallest ring and m is an integer. In one embodiment, an integer wavelength chirp leads to an $2\pi m$ phase shift in the propagation phase shift around the ring, $\phi_p$. This implies that the propagation phase shift will be the same in each microresonator and thus, in one embodiment, the rotation induced phase shift is the measurement that needs to be examined since only it changes as a result of the chirp.

The resonance frequencies are sensitive to, for example, temperature change, mechanical stresses, and vibrations. In one embodiment, the rotation sensitivity and dynamic sensing range of the gyroscope can be controlled in real time dynamically by the use of metallic gates constructed above sections of each resonator and above the gap between resonators where the evanescent coupling occurs. By connecting the metallic gates to a voltage source such that an electric current runs through the gates, the gates will heat up due to the electrical resistance with the power dissipation given by Joule heating formula $P=I^2R$. The gates locally heat the resonators located beneath them and change the index of refraction in the resonators. This change in the index of refraction will change the effective circumference of the resonator and/or the strength of the evanescent coupling between resonators. By controlling the current to the metal gates, the rotation sensitivity can be tuned in real time and as part of a feedback loop for adaptive tuning of the sensitivity.

Figure 6A:
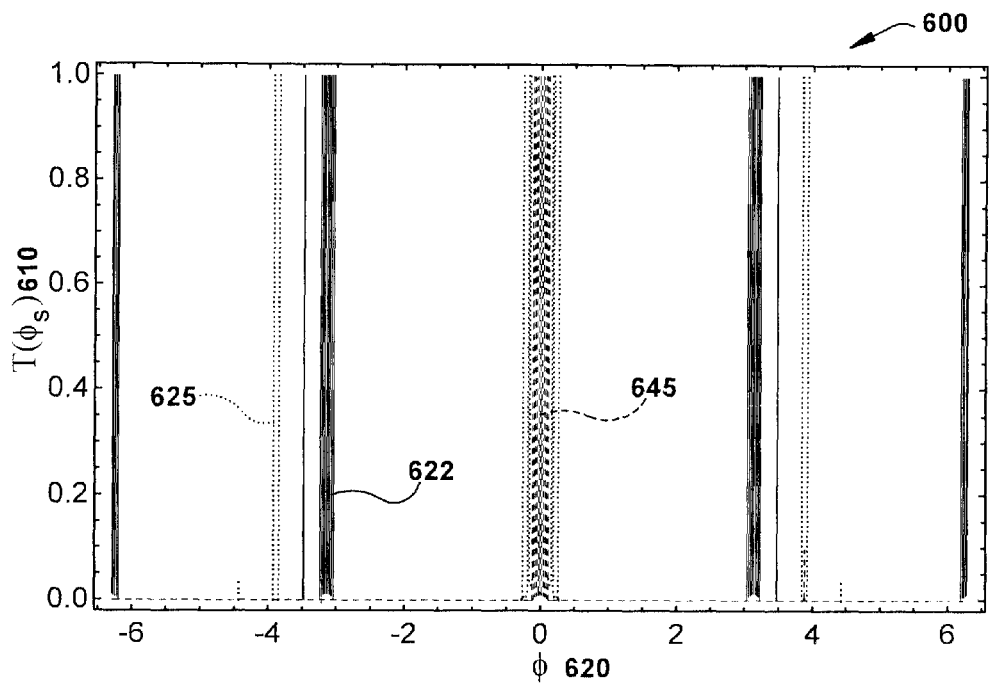
FIG. 6A is a graph of the optical transmission through a microresonator array $T(\phi_S)$ as a function of Sagnac phase shift for seven resonators and coupling strength $\kappa=0.01$ for the symmetric chirped resonator array illustrated in FIG. 5A in accordance with an embodiment of the present disclosure.

FIG. 6A is a graph 600 of the optical transmission through a microresonator array $T(\phi_S)$ 610 as a function of Sagnac phase shift 620 for seven resonators and coupling strength $\kappa=0.01$ for the symmetric chirped resonator array 500 illustrated in FIG. 5A. The transmission of the unchirped array (solid line 622) is plotted and compared to the chirped array with chirp parameter $\gamma=0.0588$, which corresponds to a one wavelength chirp (dashed line 625) for a center ring of approximately 133 μm. The dashed-dotted plot 645 shows how the transmission peaks are stretched for larger coupling ($\kappa=0.05$). The graph 600 shows a comparison of the periodic transmission of the unchirped CROW to the nonperiodic transmission due to chirping.

Figure 6B:
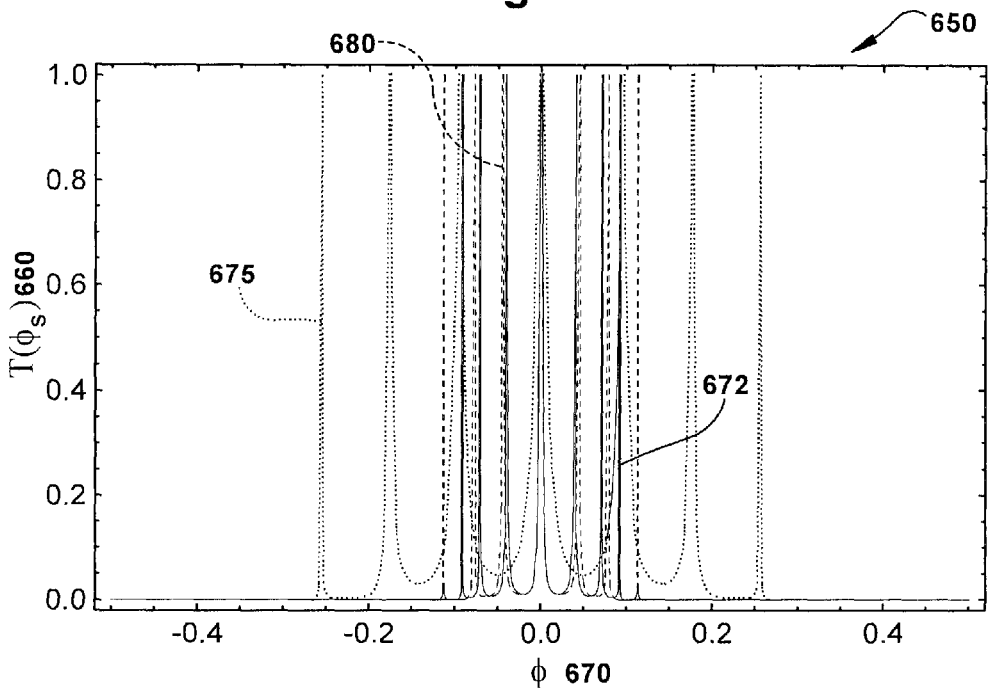
FIG. 6B is a graph of the optical transmission through a microresonator array $T(\phi_S)$ as a function of Sagnac phase shift for seven resonators and coupling strength $\kappa=0.01$ for the symmetric chirped resonator array illustrated in FIG. 5A in accordance with an embodiment of the present disclosure.

FIG. 6B is a graph 650 of the optical transmission through a microresonator array $T(\phi_S)$ 660 as a function of Sagnac phase shift 670 for seven resonators and coupling strength $\kappa=0.01$ for the symmetric chirped resonator array illustrated in FIG. 5A. It shows a close up of the transmission around zero phase of FIG. 6A. The transmission of the unchirped array (solid line 672) is plotted and compared to the chirped array with chirp parameter $\gamma=0.0588$, which corresponds to a one wavelength chirp (dotted line 675) for a center ring of approximately 133 μm. The dashed-dotted plot 680 shows how the transmission peaks are stretched for larger coupling ($\kappa=0.05$). The graph shows a comparison of the periodic transmission of the unchirped CROW to the nonperiodic transmission due to chirping, with a close up of the central transmission band.

Figure 7:
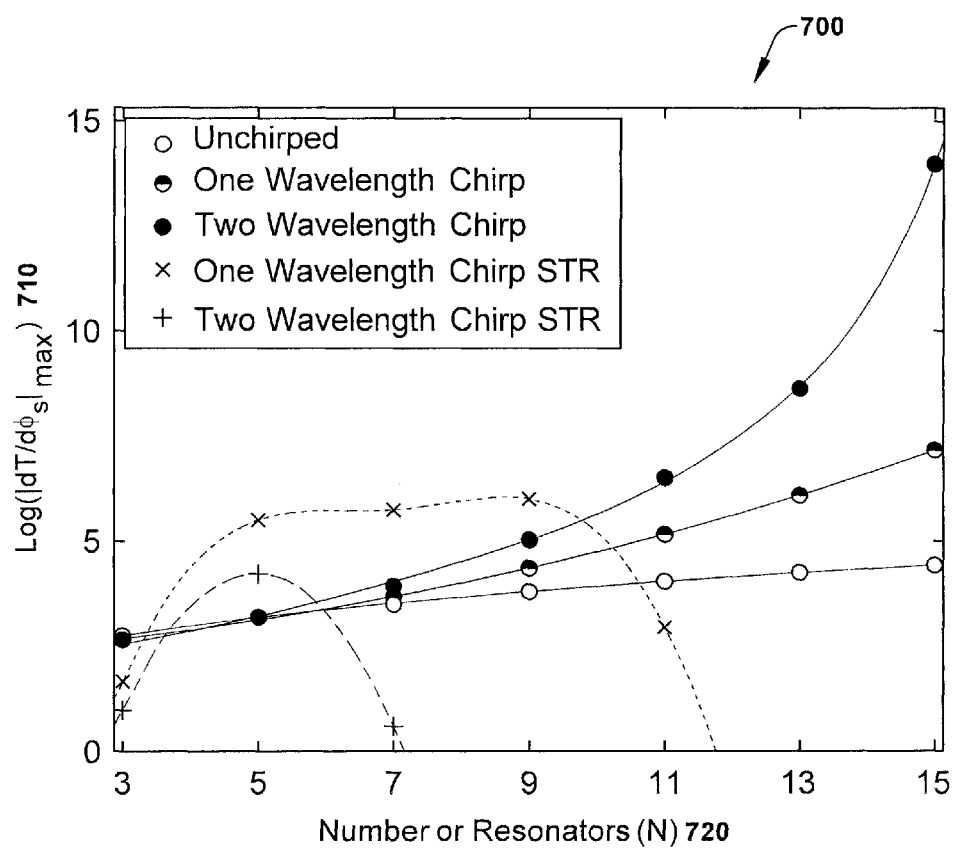
FIG. 7 is a graph of gyroscope responsivity $\log(dT/d\phi_S)_{max}$ versus number of resonators N for coupling $\kappa=0.01$ for the size chirped array illustrated in FIG. 5A in accordance with an embodiment of the present disclosure.

FIG. 7 is a graph 700 of gyroscope responsivity $\log(dT/d\phi_S)_{max}$ 710 versus number of resonators N 720 for coupling $\kappa=0.01$ for the size chirped array illustrated in FIG. 5A in accordance with an embodiment of the present disclosure. This graph 700 compares the maximum responsivity in the central transmission band for a single (n=1), with additional transmission resonances in the secondary transmission region (STR) outside the central transmission band, and two wavelength chirp (n=2), with largest maximum responsivity, to that of the resonances in the STR and the unchirped CROW.

Figure 8:
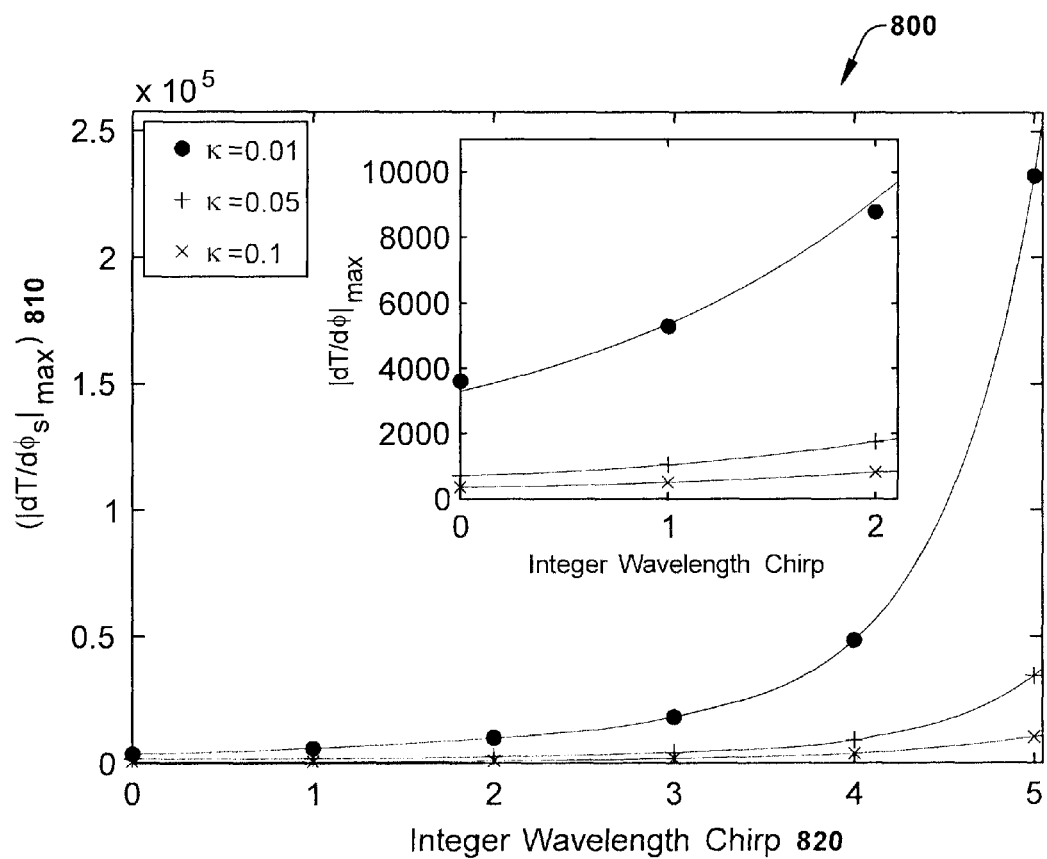
FIG. 8 is a graph showing a gyroscope maximum responsivity $(dT/d\phi_S)_{max}$ versus chirp parameter $\gamma$ for an N=7 array with couplings $\kappa=0.01$, with the largest maximum responsivity, $\kappa=0.05$, and $\kappa=0.1$ for the sized chirped array illustrated in FIG. 5A in accordance with an embodiment of the present disclosure.

FIG. 8 is a graph 800 showing a gyroscope maximum responsivity $(dT/d\phi_S)_{max}$ 810 versus chirp parameter $\gamma$ 820 for an N=7 array with couplings κ=0.01 (solid line), with the largest maximum responsivity, κ=0.05 (dashed line), and κ=0.1 (dashed dotted line). The value of the responsivity for the unchirped (γ=0, κ=0.1) array is about 350. This is for the device illustrated in FIG. 5A.

Figure 9:
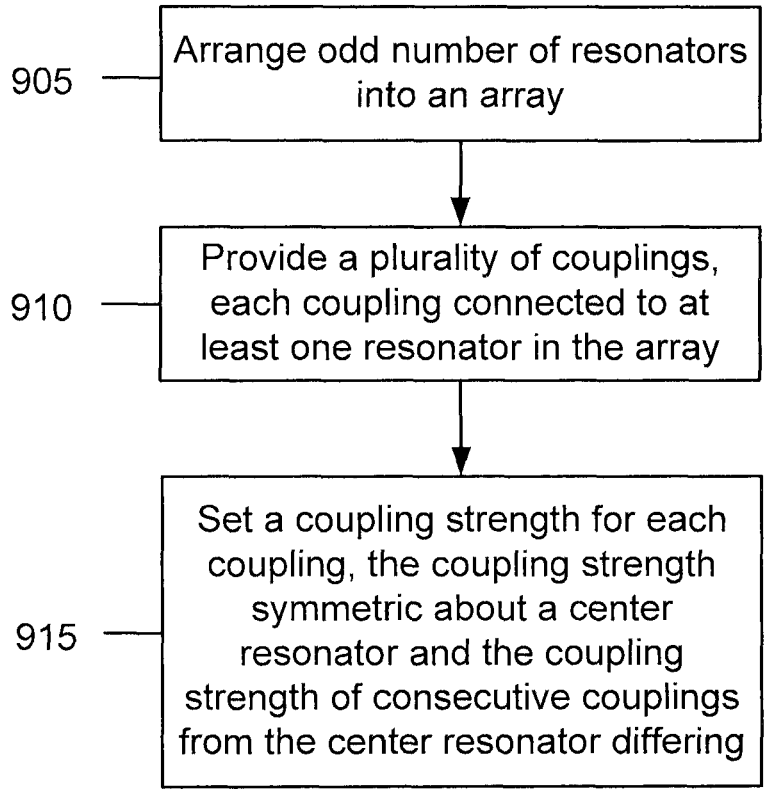
FIG. 9 is a flowchart showing steps performed to form the gyroscope of FIG. 1A in accordance with an embodiment of the present disclosure.

FIG. 9 is a flowchart showing an embodiment of steps performed to form the gyroscope described above in FIG. 1A. In one embodiment, an odd number of resonators are arranged into an array (Step 905). The end resonators in the array are connected on one side via a coupling to a waveguide. Each resonator is connected to another resonator via a coupling (Step 910). A coupling strength for each coupling is set, where the coupling strength is symmetric about the center resonator and the coupling strength of consecutive couplings from the center resonator differ to enable distributed interference of electromagnetic fields in adjacent resonators in the plurality of resonators (Step 915).

FIG. 10 is a flowchart showing an embodiment of the step performed to form the gyroscope of FIG. 5A and FIG. 5B. In one embodiment, a plurality of resonators are provided in an array with symmetric chirping of the resonators, with resonator circumferences differing by integer wavelength multiples from a waveguide towards a center resonator (Step 1005). The differences in circumferences between adjacent resonators are an integer multiple of an optical wavelength $\lambda_0$, where $\lambda_0$ is a resonance wavelength of a first resonator satisfying the condition $M_i\lambda_0=2\pi R_i$ where $2\pi R_i$ is the circumference of the first resonator and $M_i$ is a positive integer. In one embodiment, the resonator circumferences decrease by integer wavelength multiples from a waveguide towards a center resonator. In another embodiment, the resonator circumferences increase by integer wavelength multiples from a waveguide towards a center resonator.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. An optical gyroscope comprising:
   a plurality of resonators arranged in an array; and
   a plurality of couplings, each of which is connected to at least one of the plurality of resonators, wherein each of the plurality of couplings has a coupling strength, the coupling strength symmetric about a center resonator and the coupling strength of consecutive couplings starting from the center resonator and moving outward in the array differing to enable distributed interference of electromagnetic fields in adjacent resonators of the plurality of resonators.

2. The optical gyroscope of claim 1, wherein the coupling strength of the consecutive couplings of the plurality of couplings starting from the center resonator and moving outward in the array alternates between a strong coupling strength above a strong modulation threshold and a weak coupling strength below a weak modulation threshold.

3. The optical gyroscope of claim 1, wherein one of the plurality of resonators is connected to a first waveguide, and another of the plurality of resonators is connected to a second waveguide.

4. The optical gyroscope of claim 2, wherein when the coupling strength is the weak coupling strength, light circulates a plurality of times in each of the plurality of resonators before leaking into an adjacent one of the plurality of resonators.

5. The optical gyroscope of claim 4, wherein a Sagnac phase shift for at least one of the plurality of resonators is enhanced by a factor proportional to an average number of times the light circulates before coupling into the adjacent one of the plurality of resonators.

6. The optical gyroscope of claim 1, wherein the evanescent coupling of electromagnetic fields in adjacent resonators results in a single narrow transmission resonance at zero phase.

7. The optical gyroscope of claim 1, wherein the coupling strength decreases with increasing separation between the plurality of resonators.

8. The optical gyroscope of claim 1, wherein the coupling strength is dependent on a ratio of indices of refraction in one of the plurality of resonators and in a region surrounding the one of the plurality of resonators.

9. A method comprising:
   arranging a plurality of resonators into an array;
   providing a plurality of couplings, each of the plurality of couplings being connected to at least one of the plurality of resonators; and
   setting a coupling strength for each of the plurality of couplings, the coupling strength being symmetric about a center resonator of the plurality of resonators and the coupling strength of consecutive couplings of the plurality of couplings starting from the center resonator and moving outward in the array differing to enable distributed interference of electromagnetic fields in adjacent resonators of the plurality of resonators.

10. The method of claim 9, wherein the coupling strength of the consecutive couplings of the plurality of couplings starting from the center resonator and moving outward in the array alternates between a strong coupling strength above a strong modulation threshold and a weak coupling strength below a weak modulation threshold.

11. The method of claim 9, wherein one of the plurality of resonators is connected to a first waveguide, and another of the plurality of resonators is connected to a second waveguide.

12. The method of claim 10, wherein when the coupling strength is equal to the weak coupling strength, light circulates a plurality of times in each of the plurality of resonators before leaking into an adjacent one of the plurality of resonators.

13. The method of claim 12, wherein a Sagnac phase shift for at least one of the plurality of resonators is enhanced by a factor proportional to an average number of times the light circulates before coupling into the adjacent one of the plurality of resonators.

14. The method of claim 10, wherein the coupling strength decreases with separation between the plurality of resonators.

15. The method of claim 10, wherein the coupling strength is dependent on a ratio of an indices of refraction in one of the plurality of resonators and in a region surrounding the one of the plurality of resonators.

\* \* \* \* \*